United States Patent
Hiraguchi et al.

(10) Patent No.: US 6,915,976 B2
(45) Date of Patent: Jul. 12, 2005

(54) RECORDING TAPE CARTRIDGE AND DRIVE DEVICE THEREOF

(75) Inventors: Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/200,326

(22) Filed: Jul. 23, 2002

(65) Prior Publication Data

US 2003/0016471 A1 Jan. 23, 2003

(30) Foreign Application Priority Data

Jul. 28, 2001 (JP) ........................................ 2001-222146

(51) Int. Cl.$^7$ ............................................. G03B 23/02
(52) U.S. Cl. ................. 242/338.4; 242/348; 242/348.2
(58) Field of Search ............................ 242/348.2, 348, 242/348.8

(56) References Cited

U.S. PATENT DOCUMENTS

| | | | | |
|---|---|---|---|---|
| 3,532,292 A | * | 10/1970 | Crandall ................... | 242/338.4 |
| 3,797,036 A | * | 3/1974 | Eibensteiner ................ | 360/85 |
| 3,904,149 A | * | 9/1975 | Suzuki ..................... | 242/338.4 |
| 4,060,838 A | * | 11/1977 | Meermans ................. | 360/96.5 |
| 4,069,506 A | * | 1/1978 | Ueno ........................ | 360/96.5 |
| 4,672,485 A | * | 6/1987 | Takahashi ................... | 360/96.5 |
| 5,651,509 A | * | 7/1997 | Suzuki et al. ............. | 242/338.4 |
| 5,927,632 A | * | 7/1999 | Kaku et al. ............... | 242/338.4 |
| 6,505,789 B2 | * | 1/2003 | Ridl et al. ................ | 242/348.2 |
| 6,547,174 B1 | * | 4/2003 | Kaneda et al. ............ | 242/348.2 |
| 6,628,479 B1 | * | 9/2003 | Rambosek ................... | 360/132 |
| 6,663,036 B1 | * | 12/2003 | Ishihara et al. ........... | 242/348.2 |
| 6,742,738 B2 | * | 6/2004 | Hiraguchi .................... | 242/338 |

FOREIGN PATENT DOCUMENTS

JP 5-81747 4/1993

* cited by examiner

*Primary Examiner*—Donald P. Walsh
*Assistant Examiner*—Jonathan R. Miller
(74) *Attorney, Agent, or Firm*—Sughrue Mion, PLLC

(57) ABSTRACT

A tape cartridge includes a case, which is made of a lower case and an upper case, for accommodating a reel wound with a magnetic tape. The lower case includes a bottom surface disposed with two positioning holes formed separately from each other on a straight line orthogonal to a direction in which the tape cartridge is loaded into a drive device. The lower case also includes a front wall disposed with two surfaces for regulating a depth to which the case is loaded in the drive device. The two surfaces are positioned on straight lines that pass along the loading direction through the center of the positioning holes when seen from below. Positioning pins of the drive device are inserted into the positioning holes when regulating protrusions of the drive device abut against the two surfaces to regulate the depth to which the case is loaded.

23 Claims, 6 Drawing Sheets

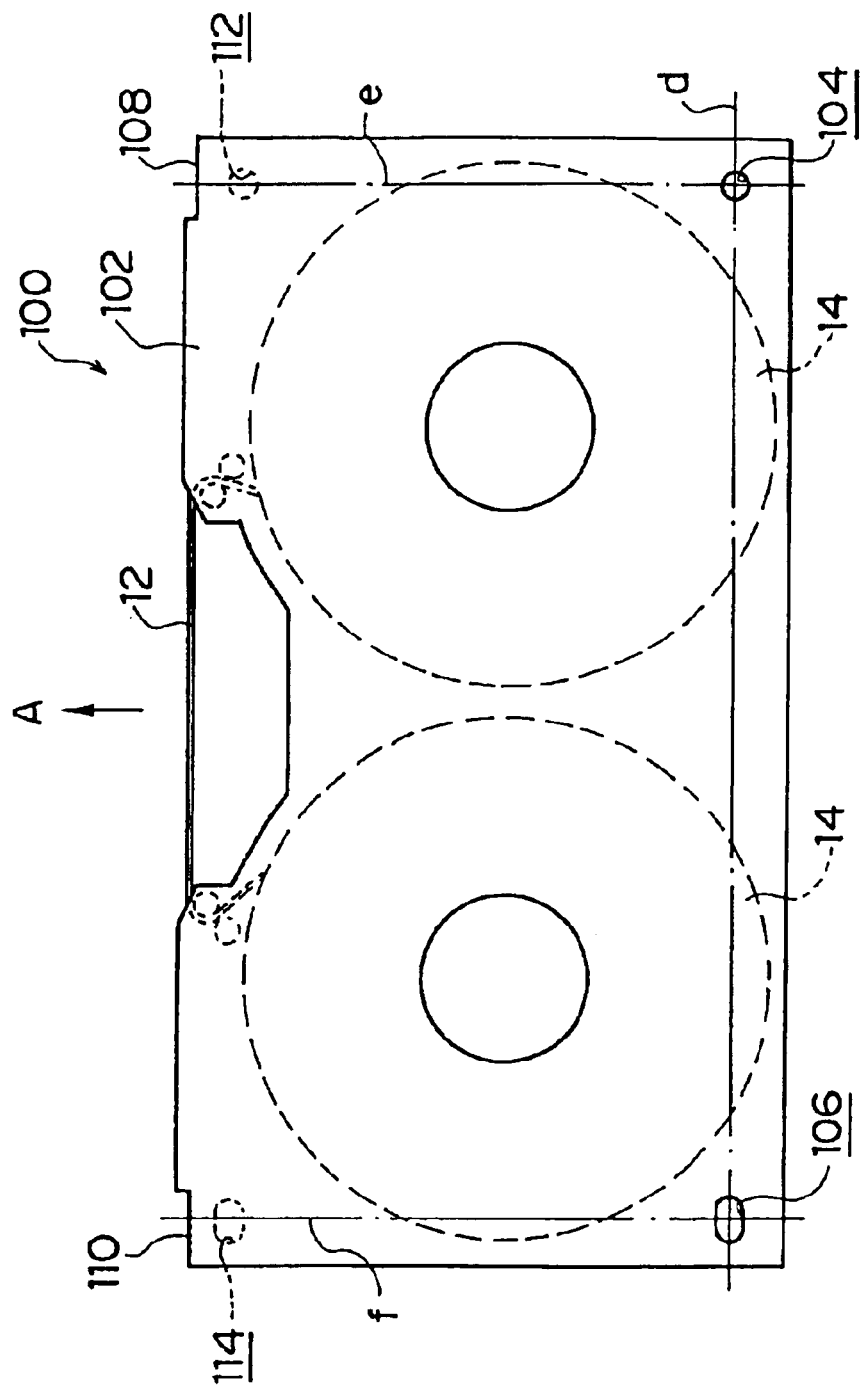

RECORDING TAPE CARTRIDGE AND DRIVE DEVICE THEREOF

BACKGROUND OF THE INVENTION

1. Field of the Invention

The present invention relates to a recording tape cartridge including a case for accommodating a reel wound with a recording tape, such as a magnetic tape, and to a drive device into which the recording tape cartridge is loaded and with which the recording tape cartridge is used.

2. Description of the Related Art

A recording tape, such as a magnetic tape, is used as an audio or video recording medium and for storing computer data. The recording tape is typically wound on a reel that is rotatably accommodated in a molded resin case of a recording tape cartridge in order to prevent dust from adhering to a recording surface of the recording tape and to prevent the recording surface from being damaged from contact.

Single reel cartridges (used mainly for backing up information in a computer or the like), which comprise a case accommodating a single reel wound with a recording tape, and double reel cartridges, which include two reels for feeding and taking up the recording tape (e.g., audio and video cassettes), are known. These cartridges are loaded in a drive device (a recording/reproducing device) to record information on or reproduce information from the recording tape.

When the recording tape cartridge is loaded in the drive device, the case is positioned within the drive device, and then the recording tape is pulled out from the case, guided along a predetermined path, and moved close to a recording/reproducing head. As a result, information is recorded on the recording tape, or information recorded on the recording tape is reproduced.

In order for the recording tape cartridge to be positioned horizontally within the drive device, the drive device is typically disposed with a bucket that is movable horizontally and vertically and includes regulating protrusions against which two portions of a front surface (i.e., the surface disposed in the direction in which the recording tape cartridge is loaded) of the case abut. The drive device is also disposed with positioning pins that are inserted into a pair of positioning holes in a bottom surface of the case, with the positioning holes being disposed separately from each other along a straight line perpendicular to the loading direction.

However, in the conventional recording tape cartridge, the positions of the two portions on the front surface of the case against which the regulating protrusions of the bucket abut are not defined on the basis of the positions of the positioning holes (i.e., the portions on the front surface of the case do not coincide with the positions at which the pair of positioning holes are projected on the case front surface). Therefore, there has been the problem of poor dimensional accuracy with respect to the positioning holes.

For this reason, the case (or the straight line connecting the pair of positioning holes) is sometimes slanted with respect to the loading direction while the regulating protrusions of the bucket abut against the front surface of the case, so that the positioning holes of the case do not coincide with the positioning pins of the drive device.

When the bucket is moved downward in this state, the edges of the positioning holes can be shaved off by the positioning pins or the like, whereby the opening of the positioning holes is widened and the accuracy with which the recording tape cartridge is horizontally positioned in the drive device becomes poor. Further, when the positioning pins are not completely inserted into the positioning holes due to the positioning holes and the positioning pins not being aligned, the accuracy with which the recording tape cartridge is vertically positioned in the drive device also becomes poor.

Poor accuracy with which the recording tape cartridge is positioned in the drive device inhibits the recording tape from being properly pulled out from the case, and may cause the drive device to fail. There has thus been, together with the densification of the recording tape (increase in recording capacity), a demand to improve the accuracy with which recording tape cartridges are positioned in drive devices, and it is conceivable for the aforementioned problem to become more pronounced.

SUMMARY OF THE INVENTION

In view of the aforementioned circumstances, an object of the present invention is to provide a recording tape cartridge in which the accuracy with which the recording tape cartridge is horizontally positioned in a drive device is improved.

In order to achieve the object, a first aspect of the invention is a recording tape cartridge used with a drive device that includes positioning members, which are inserted into the recording tape cartridge to position the recording tape cartridge when the recording tape cartridge is loaded into the drive device, and abutting surface, which abuts against at least a portion of a loading direction front surface of the recording tape cartridge, said recording tape cartridge comprising: a case for accommodating a reel wound with the recording tape; a pair of positioning holes formed separately from each other on a bottom surface of the case, said positioning holes being for positioning members of the drive device to be inserted therein; and at least one regulating surface disposed at the front surface of the case, said at least one regulating surface abutting against the abutting surface, wherein a portion of said at least one regulating surface is disposed on a straight line passing along the loading direction through one of the pair of positioning holes.

The recording tape cartridge of the first aspect of the invention may further include another regulating surface so that a pair of regulating surfaces is disposed at the front surface of the case.

When the recording tape cartridge is loaded in the drive device during use, the pair of regulating surfaces provided on the end surface of the case are made to abut against the abutting portion of the drive device. In this state, the positioning members of the drive device are inserted in the pair of positioning holes provided on the bottom surface of the case so that the case is positioned in the horizontal direction. The recording tape is pulled out from the case in the aforementioned state, and recording or reproduction of information is carried out for the recording tape.

At least one of the pair of regulating surfaces is disposed on a straight line passing through one of the pair of positioning holes along the direction in which the case is loaded in the drive device. In other words, at least one of the regulating surfaces intersects a virtual plane defined by a straight line extending along the loading direction and a direction in which the positioning members are inserted in the positioning holes, for example, a plane on which a movement locus of the center line of the positioning hole is plotted when the case is loaded in the drive device, and is disposed based on one of the positioning holes. Accordingly, dimensional accuracy of at least one of the regulating surfaces to one of the positioning holes is maintained. Further, dimensional accuracy of the regulating surface to the positioning hole can be improved only by improving processing accuracy (for example, the accuracy of a die) on the aforementioned virtual plane.

A second aspect of the present invention is a drive device for effecting at least one of recording information on and reproducing information from a recording tape accommodated in case of a recording tape cartridge that is loaded into the drive device, said case including a pair of positioning holes, said drive device comprising: an abutting surface that abuts against at least a portion of a loading direction front surface of the case when the case is loaded into the drive device, to thereby regulate a depth to which the case is loaded in the drive device; and a pair of positioning members that are inserted in the positioning holes when the case is loaded into the drive device and the recording tape cartridge is located at a predetermined position at which at least one of recording and reproducing of information is carried out, wherein at least a portion of the abutting surface is disposed on a straight line passing along the loading direction through one of the pair of positioning members.

At the side of the drive device as well, at least one of the abutting portions and one of the positioning members are disposed on the aforementioned virtual plane. Therefore, dimensional accuracy of the at least one abutting portion to the one positioning member is maintained. Further, so long as processing accuracy on the aforementioned virtual plane is improved, dimensional accuracy of the at least one abutting portion to the one positioning member can be improved.

In the aforementioned first aspect, as the regulating surface is disposed on a straight line passing through the positioning hole along the loading direction, the regulating surface is positioned nearest the positioning hole on the leading surface of the case in the loading direction. Therefore, dimensional accuracy of the regulating surface to the positioning hole further improves.

As a result, the pair of regulating surfaces abut against the abutting portions of the drive device respectively, and positioning accuracy of the case in a state of being loaded at a regulated depth improves, thereby allowing the positioning members of the drive device to be reliably and properly inserted in the pair of positioning holes respectively.

Particularly, so long as the pair of regulating surfaces each intersect a straight line passing through a corresponding one of the pair of positioning holes along the loading direction, and are each disposed on the straight line, the positioning members are more reliably and properly inserted in the positioning holes respectively without causing the case in the state of being loaded at a regulated depth (or a straight line connecting the pair of positioning holes) to be inclined to the loading direction.

As described above, in the recording tape cartridge according to the first aspect, horizontal positioning accuracy thereof in the drive device can be improved.

Furthermore, in the recording tape cartridge provided with a single reel, so long as a pull-out member, for example, a leader pin, used to pull out a recording tape connected to an end of the recording tape is disposed on a straight line connecting the regulating surface and the positioning hole and extending along the direction in which the case is loaded in the drive device, positioning accuracy of the pull-out member in the case, that is, positioning accuracy in the drive device also improves, and favorably, the recording tape can be more reliably pulled out.

BRIEF DESCRIPTION OF THE DRAWINGS

FIG. 5A is a side view showing the magnetic tape cartridge before being loaded onto a bucket. FIG. 5B is a partially cutaway side view showing a depth to which the magnetic tape cartridge is loaded in the bucket being regulated. FIG. 5C is a partially cutaway side view showing the magnetic tape cartridge located immediately above a position at which it is positioned. FIG. 5D is a partially cutaway side view showing the magnetic tape cartridge positioned in the drive device.

FIG. 6 is a bottom view showing a recording tape cartridge according to a modified example of the embodiment of the present invention.

DETAILED DESCRIPTION OF THE PREFERRED EMBODIMENT

Figure 1:
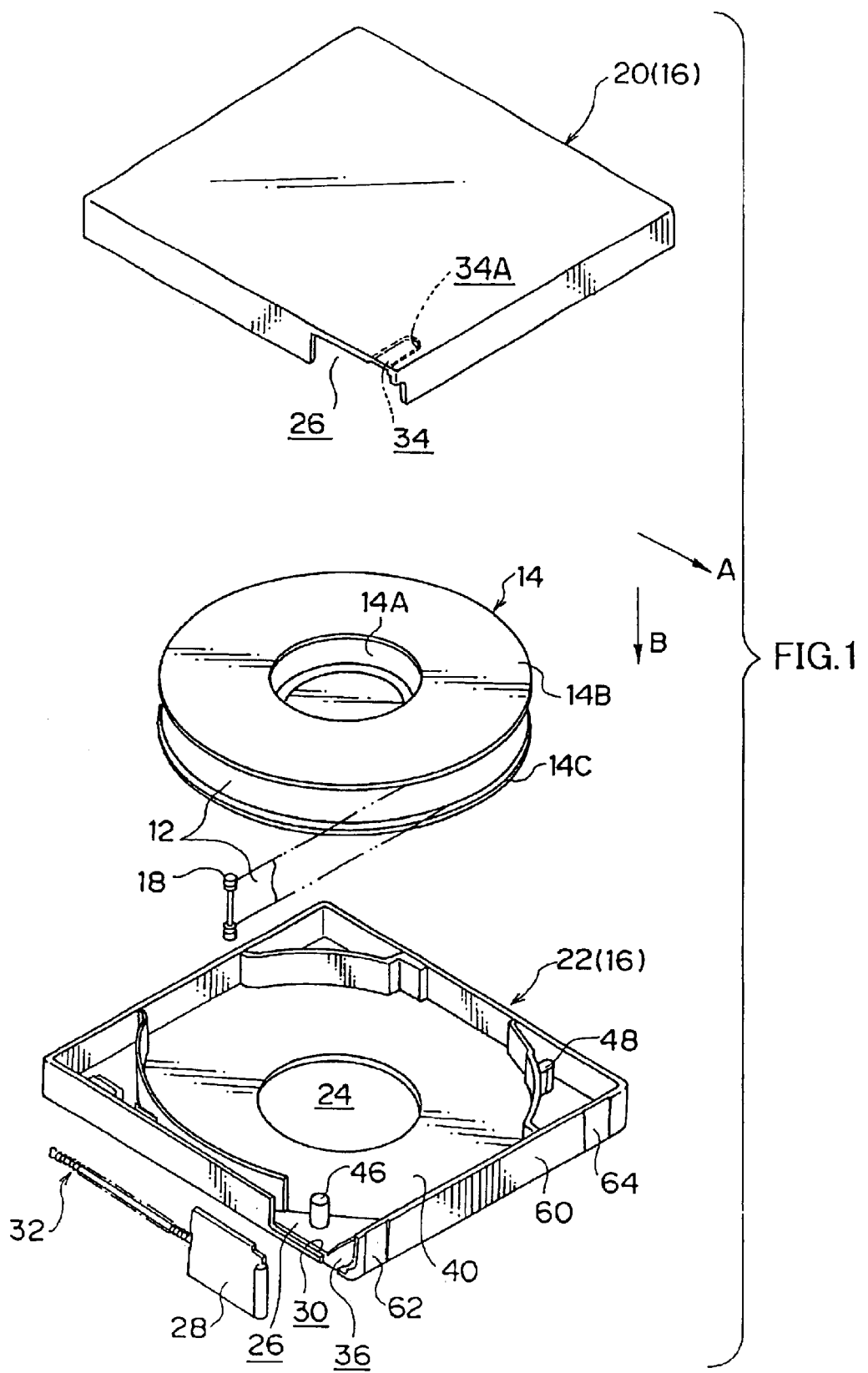
FIG. 1 is an exploded perspective view showing an overall magnetic tape cartridge according to an embodiment of the present invention.

A recording tape cartridge 10 according to an embodiment of the present invention will be described hereinafter with reference to FIGS. 1 to 5. For convenience of explanation, terms such as "front", "rear", "upper", "lower", and "left" (or "left-side") and "right" (or "right-side") used herein refer to orientations as one faces the direction in which the recording tape cartridge 10 is loaded in a drive device, which direction is indicated by arrow A in the drawings. Thus, arrow B indicates a downward direction.

As shown in FIG. 1, the recording tape cartridge 10 comprises a substantially rectangular case 16 that rotatably accommodates a single reel 14 wound with a magnetic tape 12 serving as a recording tape (i.e., a medium on which information is recorded and from which information is reproduced) when seen from above.

The reel 14 comprises a substantially cylindrical reel hub 14A, and an upper flange 14B and a lower flange 14C that are coaxially disposed at, and integrally rotatable with, upper and lower ends of the hub 14A. The magnetic tape 12 is wound at an outer periphery of the reel hub 14A between the upper flange 14B and the lower flange 14C. A leader pin 18 that serves as a pull-out member is connected to a free end of the magnetic tape 12, with upper and lower ends of the leader pin 18 respectively protruding from upper and lower edges of the magnetic tape 12.

The case 16 comprises an upper case 20 and a lower case 22 that are each made of synthetic resin and are joined together. An opening 24 for a gear is formed in a substantial center of a bottom plate 40 of the lower case 22, and a reel gear (not shown) of the reel 14 appears therefrom. When the reel gear is operated externally, the reel 14 is driven to rotate in the case 16.

The case 16 includes a substantially rectangular opening 26 disposed at a front right-hand side corner thereof, and the magnetic tape 12 is pulled out from the case 16 through the opening 26.

The opening 26 is opened up and closed off by a slide door 28. Namely, a lower end of the slide door 28 is inserted into a rail groove 30 disposed in the lower case 22, and an upper end of the slide door 28 is inserted into a rail groove 30 disposed in the upper case 20 (the rail groove 30 of the upper case 20 is not shown). The rail grooves 30 are disposed along the opening 26 and the slide door 28 moves slidably in the rail grooves 30. The slide door 28 is urged forward by a coil spring 32 to ordinarily close off the opening 26.

Holding grooves 34 and 36, into which the upper and lower ends of the leader pin 18 are respectively inserted and held by a plate spring (not shown) or the like, are disposed at an inner (i.e., left) side of the opening 26. Each of the holding grooves 34 and 36 continuously connects with and opens to the corresponding rail groove 30, with no partitioning wall formed between either of the holding grooves 34 or 36 and the corresponding groove 30. Positions of holding portions 34A and 36A, at which the leader pin 18 is held in the holding grooves 34 and 36, will be described later.

Figure 2:
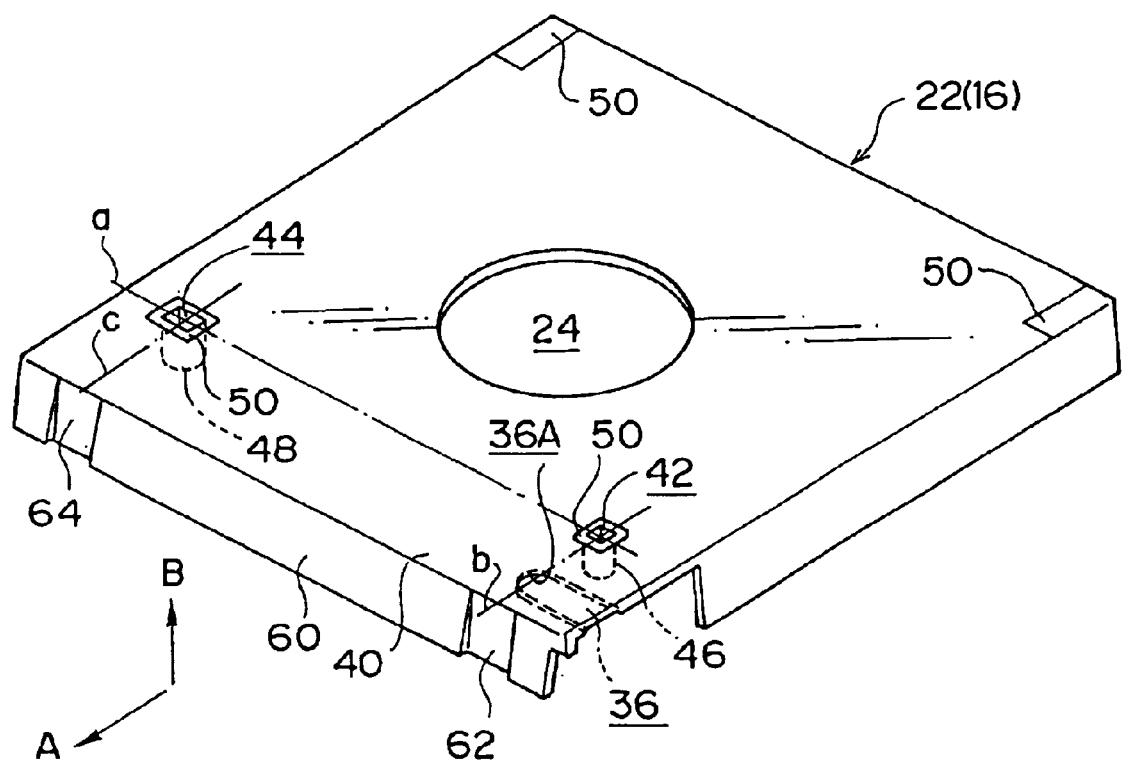
FIG. 2 is a perspective view seen from below of a lower case of the magnetic tape cartridge according to the embodiment of the present invention.

As shown in FIG. 2, positioning holes 42 and 44 are formed in the bottom plate 40 separately from each other on a straight line a orthogonal to the direction indicated by arrow A. The positioning hole 42 is disposed close to the opening 26 and has a substantially squarelike shape when seen from below. Moreover, the positioning hole 42 includes a bottom that corresponds to a top of a convex portion 46 (see FIG. 1) protruding up from an inner surface of the bottom plate 40. The positioning hole 42 becomes a reference for horizontally positioning the case 16 (recording tape cartridge 10) when a positioning pin 90 of the drive device is inserted into the positioning hole 42.

The positioning hole 44 includes a bottom that corresponds to a top of a convex portion 48 (see FIG. 1) protruding up from the inner surface of the bottom plate 40. The positioning hole 44 also becomes a reference for horizontally positioning the case 16 (recording tape cartridge 10) when a positioning pin 90 is inserted into the positioning hole 44, and is formed as an elongated hole extending in a left-to-right direction of the case (i.e., the direction along line a) to allow for positional error.

A flat reference surface 50, which has been subjected to no surface design treatment, is disposed on an outer surface of the bottom plate 40 around each of the positioning holes 42 and 44 and also at right and left corners of the rear end of the bottom plate 40. The reference surfaces 50 serve as references for vertically positioning the case 16 so that height reference surfaces 92 (described later) of the drive device abut against the respectively corresponding reference surfaces 50.

The case 16 (the recording tape cartridge 10) is thus horizontally positioned and prevented from moving in the horizontal direction (i.e., in longitudinal and transverse directions) by the positioning pins 90 of the drive device being inserted into the positioning holes 42 and 44. Additionally, the case 16 is vertically positioned by the reference surfaces 50 which have the same height.

Substantially rectangular regulating surfaces 62 and 64, which regulate a depth to which the case 16 is loaded in a bucket 74 of the drive device, are disposed in a front wall 60 of the lower case 22. The regulating surfaces 62 and 64 are recessed with respect to the rest of the outer surface of the front wall 60 and are substantially perpendicular to the loading direction. In other words, the draft of each regulating surface 62 and 64 when molded is made smaller than that of the rest of the outer surface of the front wall 60 (e.g., if the draft of the rest of the outer surface of the front wall 60 is 2°, the draft of each of the regulating surfaces 62 and 64 is 0.5°).

As shown in FIG. 2, the regulating surface 62 is disposed close to the opening 26 and positioned such that a straight line b drawn along the direction of arrow A from the left-to-right-direction center of the positioning hole 42 passes through the left-to-right-direction center of the regulating surface 62. Similarly, the regulating surface 64 is positioned such that a straight line c drawn along the direction of arrow A from the left-to-right-direction center of the positioning hole 44 passes through the left-to-right-direction center of the regulating surface 64. It should be noted that lines b and c are parallel to each other and orthogonal to line a.

The holding portion 36A is the (left) end of the holding groove 36, has a semicircular configuration, and corresponds to the lower end of the substantially cylindrical positioning pin 18. The holding portion 36A is disposed such that a center thereof (i.e., a diameter defining the semicircle) is positioned on line b when seen from below. The holding portion 34A of the holding groove 34, which corresponds to (faces) the holding groove 36 and is formed in the upper case 20, is similarly configured and positioned on line b when seen from below.

Figure 3:
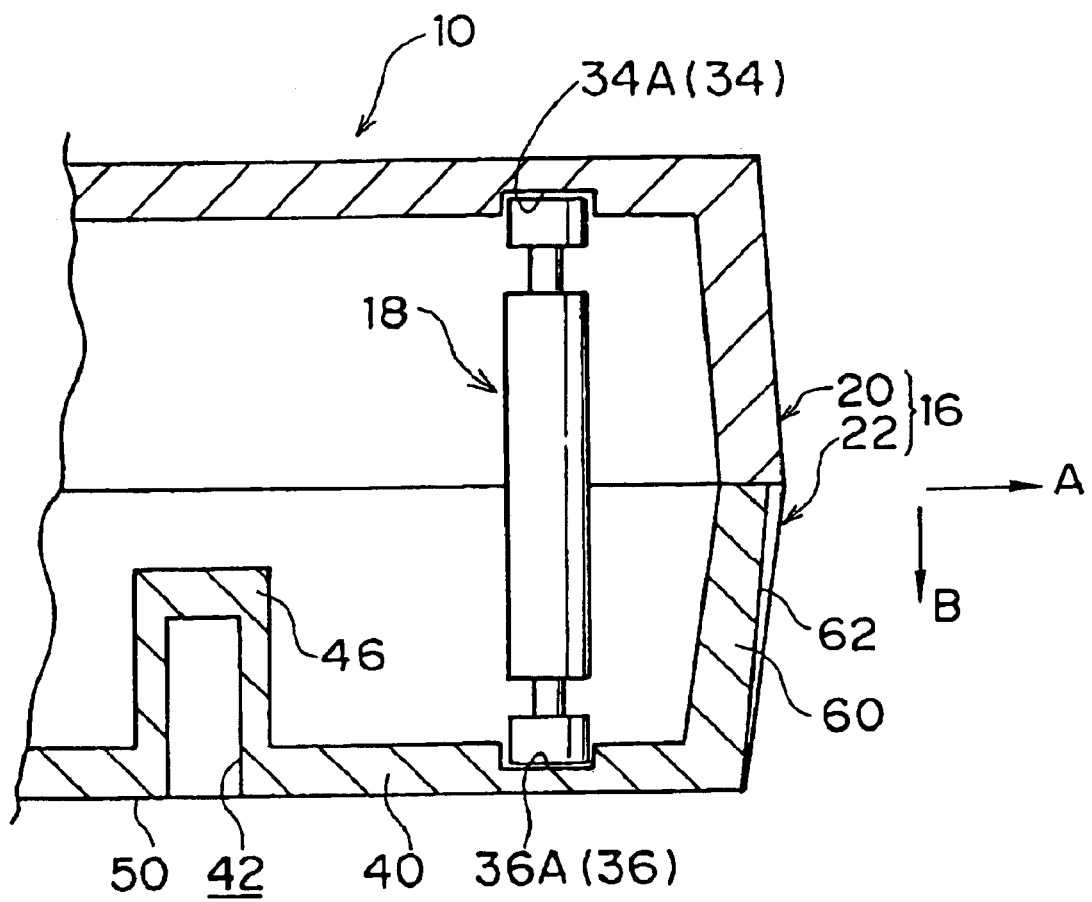
FIG. 3 is a cross sectional view taken along a straight line connecting a positioning hole and a regulating surface, showing a front part of the magnetic tape cartridge according to the embodiment of the present invention.

In other words, as shown in the cross-sectional view of FIG. 3 taken along line b, the right-to-left direction center of the positioning hole 42, the right-to-left direction center of the regulating surface 62, and the centers of the holding portions 34A and 36A are positioned on a virtual plane defined by line b and the direction in which the positioning pin 90 is inserted into the positioning hole 42 (i.e., the direction indicated by arrow B).

Next, description will be given of a bucket 72 of a loading section 70 in the drive device into which the recording tape cartridge 10 is loaded, with reference to FIG. 4.

Figure 4:
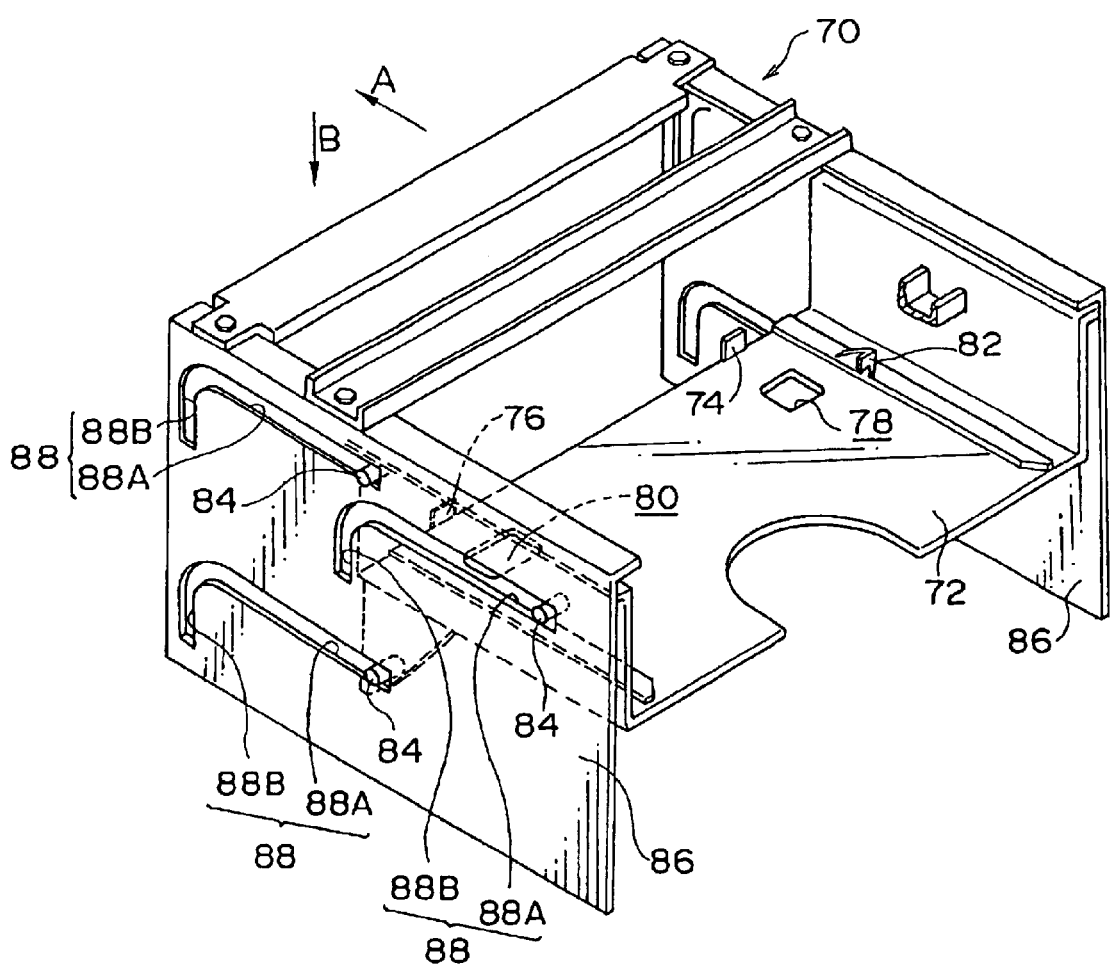
FIG. 4 is a perspective view schematically showing a loading section of a drive device into which the magnetic tape cartridge according to the embodiment of the present invention is loaded.

As shown in FIG. 4, the bucket 72 is formed to mount the recording tape cartridge 10. Regulating protrusions 74 and 76, against which the regulating surfaces 62 and 64 of the recording tape cartridge 10 respectively abut, are disposed at the front end of the bucket 72. A through hole 78 is formed in the bucket 72 behind the regulating protrusion 74 to correspond to the positioning hole 42, and a though hole 80 is formed in the bucket 72 behind the regulating protrusion 76 to correspond to the positioning hole 44. An engaging portion 82 is provided at the right side of the bucket 72 to engage with the slide door 28.

A plurality of guide pins 84 protruding from both right-to-left direction ends of the bucket 72 are supported by guide grooves 88 disposed in support walls 86 that face each other. Each guide groove 88 comprises a horizontal guide 88A that extends in the direction of arrow A and a vertical guide 88B that extends in the direction of arrow B from the end of the horizontal guide 88A furthest disposed in the direction of arrow A. As a result, when the recording tape cartridge 10 is loaded in the bucket 72, the bucket 72 is movable both horizontally and vertically.

The positioning pins 90 serve as positioning members of the drive device, and the height reference surfaces 92 are provided below the bucket 72 (loading section 70). The positioning pins 90 are inserted into (engage with) the positioning holes 42 and 44 of the recording tape cartridge 10 to horizontally position the recording tape cartridge 10 (case 16). The height reference surfaces 92 abut against the reference surfaces 50 to vertically position the recording tape cartridge 10. The positioning pins 90 and the height reference surfaces 92 will be further described below along with the operation of the recording tape cartridge 10.

Next, the operation of the embodiment will be described with reference to FIGS. 5A to 5D, which show the loading and positioning of the recording tape cartridge 10 in the drive device.

Figure 5A:
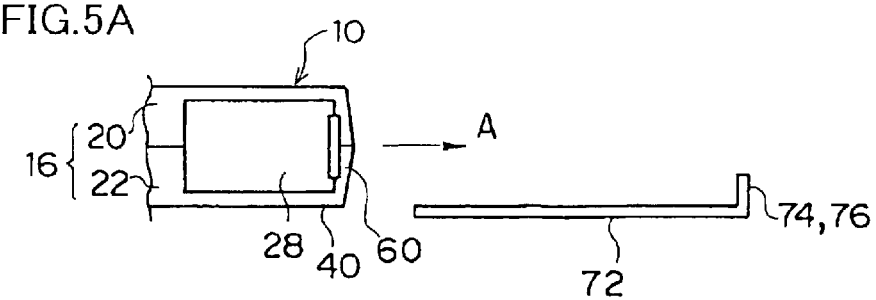
FIGS. 5A to 5D are side views showing loading and positioning of the magnetic tape cartridge according to the embodiment of the present invention in the drive device.

As shown in FIG. 5A, the recording tape cartridge 10 is loaded in the direction of arrow A onto the bucket 72 of the loading section 70 in the drive device. The slide door 28 is thereby relatively moved in the direction opposite to arrow A counter to the urging force of the coil spring 32 while engaging with the engaging portion 82 (not shown), whereby the opening 26 is opened.

Figure 5B:
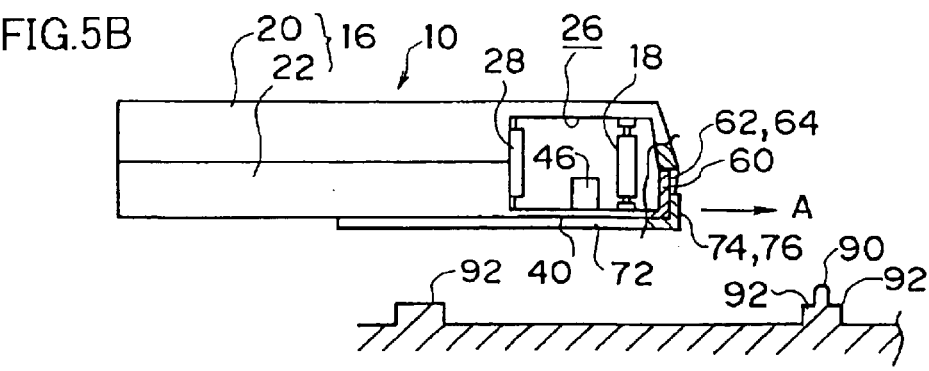

As shown in FIG. 5B, when the recording tape cartridge 10 is further moved in the direction of arrow A, the regulating surfaces 62 and 64 of the case 16 respectively abut against the regulating protrusions 74 and 76 of the bucket 72, and the depth to which the case 16 is loaded on the bucket 72 (that is, relative movement of the case 16 with respect to the bucket 72) is regulated.

When the depth to which the case 16 is loaded on the bucket 72 is regulated, the bucket 72 mounted with the recording tape cartridge 10 (case 16) is moved in the direction of arrow A while being guided by the guide pins 84 in the horizontal guides 88A of the guide grooves 88.

Figure 5C:
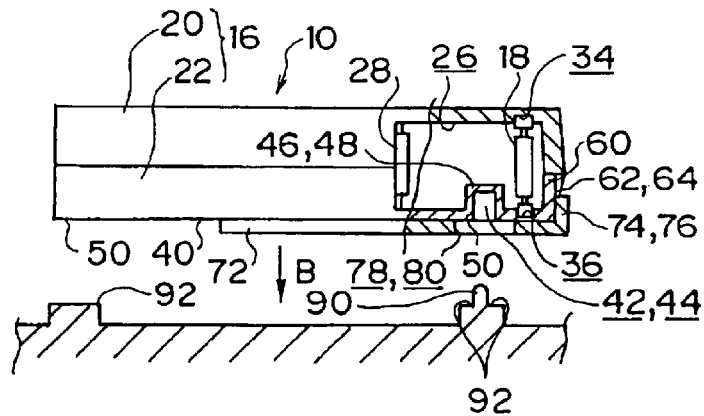

As shown in FIG. 5C, when each guide pin 84 abuts against the end of the horizontal guide 88A at the side furthest disposed in the direction of arrow A, the positioning holes 42 and 44 of the recording tape cartridge 10 are positioned directly above the positioning pins 90 of the drive device. The bucket 72 is moved (downward) in the direction indicated by arrow B together with the recording tape cartridge 10 (case 16) while being guided by the guide pins 84 in the vertical guides 88B of the guide grooves 88.

Figure 5D:
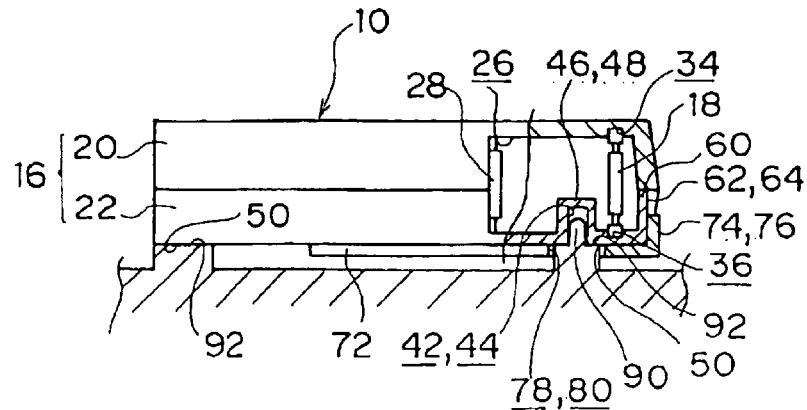

As shown in FIG. 5D, when the bucket 72 is moved downward, the positioning pins 90 pass through the through holes 78 and 80 of the bucket 72 and are inserted in the positioning holes 42 and 44 of the recording tape cartridge 10, whereby the case 16 (that is, the recording tape cartridge 10) is horizontally positioned (in longitudinal and transverse directions of the case 16) and prevented from rotating.

Moreover, as the bucket 72 is moved downward, the height reference surfaces 92 disposed on the same plane in the heightwise direction abut against the reference surfaces 50, and the case 16 (the recording tape cartridge 10) is vertically positioned.

In this state, protruding ends of the leader pin 18 are hooked by a hook member, which serves as pull-out means of the drive device, and pulled out from the holding grooves 34 and 36 of the case 16 by the hook member being moved toward the winding reel of the drive device.

As a result, the magnetic tape 12 is pulled out from the case 16 through the opening 26 and is led to the winding reel while being guided along a predetermined path by the pull-out means. The reel 14 and the winding reel are driven to rotate synchronously, and data is recorded on or reproduced from the magnetic tape 12 while the magnetic tape 12 is being sequentially wound onto the winding reel.

When the magnetic tape 12 is completely wound on the winding reel, the reel 14 and the winding reel are driven to rotate in reverse, and the magnetic tape 12 is rewound onto the reel 14. When the magnetic tape 12 is completely rewound onto the reel 14, the leader pin 18 reenters the holding grooves 34 and 36 and is held by a plate spring (not shown) at the holding portions 34A and 36A.

The bucket 72 is then moved upward while being guided in the vertical guides 88B of the guide grooves 88, and the positioning pins 90 are removed from the positioning holes 42 and 44. When the upward movement of the bucket 72 is completed (as shown in FIG. 5C), the bucket 72 is moved in the direction opposite to that of arrow A while being guided in the horizontal guides 88A of the guide grooves 88 and returned to its initial position (see FIG. 5B).

Subsequently, the recording tape cartridge 10 is further moved in the direction opposite to that of arrow A, the slide door 28 is disengaged from the engaging portion 82 while closing off the opening 26 due to urging force of the coil spring 32, and the recording tape cartridge 10 is discharged from the bucket 72 (the loading section 70 of the drive device). As a result, the recording tape cartridge 10 is returned to its initial state.

The regulating surface 62 is disposed on line b passing through the positioning hole 42 along the direction of arrow A. In other words, the regulating surface 62 intersects a virtual plane defined by line b and the direction in which the positioning pin 90 is inserted in the positioning hole 42 (that is, the direction of arrow B), and is disposed on the basis of the positioning hole 42. The virtual plane herein is a plane that coincides with the cross section shown in FIG. 3, on which a movement locus of the positioning hole 42 in the directions indicated by arrows A and B is plotted when the case 16 is loaded in the drive device. Accordingly, the dimensional accuracy of the regulating surface 62 with respect to the positioning hole 42 is secured. It is also possible to improve the dimensional accuracy of the regulating surface 62 with respect to the positioning hole 42 simply by improving processing accuracy (e.g., die accuracy) on the virtual plane.

In the drive device as well, the (movement locus of the) regulating protrusion 74 and the positioning pin 90 corresponding to the positioning hole 42 are disposed on the virtual plane. Therefore, the dimensional accuracy of the regulating protrusion 74 with respect to the positioning pin 90 is secured. Further, it is possible to improve the dimensional accuracy of the regulating protrusion 74 with respect to the positioning pin 90 by improving processing accuracy on the virtual plane.

Furthermore, the regulating surface 62 disposed on the straight line b passing through the positioning hole 42 is disposed in the front surface of the case 16 (the front wall 60 of the lower case 22) nearest the positioning hole 42. Therefore, the dimensional accuracy of the regulating surface 62 with respect to the positioning hole 42 further improves.

Similarly, the dimensional accuracy of the regulating surface 64 with respect to the positioning hole 44 is secured and improved. Further, the dimensional accuracy of the regulating surface 64 with respect to the positioning hole 44 can be further improved by merely improving the processing accuracy on the virtual plane defined by the straight line c and the direction indicated by arrow B. Moreover, in the drive device as well, the dimensional accuracy of the regulating protrusion 76 with respect to the positioning pin 90 corresponding to the positioning hole 44 can be secured and improved.

Accordingly, the regulating surfaces 62 and 64 respectively abut against the regulating protrusions 74 and 76 of the bucket 72, and positional accuracy of the case 16 (the recording tape cartridge 10) is improved while the depth to which the case 16 is loaded in the bucket 72 is regulated. The positioning pins 90 of the drive device can be reliably and properly inserted into the positioning holes 42 and 44 without the case 16 itself or line a being slanted as was conventionally the case.

Thus, according to the embodiment, the accuracy with which the recording tape cartridge 10 is horizontally positioned in the drive device can be improved.

Also, the leader pin 18 connected to the leading end of the magnetic tape 12 is held in the case 16 at the holding portions 34A and 36A disposed on the straight line b connecting the positioning hole 42 and the regulating surface 62. Therefore, the positioning accuracy of the leader pin 18 in the case 16 (that is, the positioning accuracy in the drive device) is also improved, and the leader pin 18 is reliably caught by the hook member of the drive device. Accordingly, the magnetic tape 12 is more reliably pulled out from the case 16.

In the embodiment, the recording tape cartridge 10 contains the single reel 14 accommodated in the case 16, but the present invention is not limited to the same. For example, the recording tape cartridge of the invention may also encompass a recording tape cartridge 100 shown in FIG. 6, in which two reels 14 for feeding and winding the tape are disposed.

In the recording tape cartridge 100 shown in FIG. 6, two positioning holes 104 and 106 are provided separately from each other near the rear end of the bottom surface of a case 102 on a straight line d orthogonal to the direction indicated by arrow A.

Further, regulating surfaces 108 and 110 are formed on the front surface (the surface facing the direction indicated by arrow A) of the case 102. The regulating surface 108 is positioned such that a straight line e drawn along the direction of arrow A from the left-to-right direction center of the positioning hole 104 passes through the left-to-right direction center of the regulating surface 108. Similarly, the regulating surface 110 is positioned such that a straight line f drawn along the direction of arrow A from the left-to-right direction center of the positioning hole 106 passes through the left-to-right direction center of the regulating surface 110. Lines e and f are parallel to each other and orthogonal to line d.

The recording tape cartridge 100 also has the same effects as those of the recording tape cartridge 10. It should be noted that, in place of the positioning holes 104 and 106 disposed near the rear end of the case 102, positioning holes 112 and 114 may be disposed near the front end of the case 102 as indicated by imaginary lines in FIG. 6.

In the embodiment and modified example thereof, the regulating surfaces 62 and 64 (or 108 and 110) are preferably positioned on lines b and c (or e and f) passing through the positioning holes 42 and 44 (or 104 and 106) along the direction of arrow A. However, the present invention is not limited to the same. For example, one of the regulating surfaces 62 and 64 may be positioned on line b or c. In this case, the regulating surface 62 disposed close to the holding portion 36A, in which the leader pin 18 is held, is usually positioned on line b. Further, in the recording tape cartridge 100, the regulating surface 108 corresponding to the positioning hole 104 that is not elongated is usually positioned on line e.

Moreover, in the embodiment, the holding portions 34A and 36A for holding the leader pin 18 are preferably positioned on line b. However, the present invention is not limited to the same. The holding portions 34A and 36A may not be positioned on line b. For example, the holding portions 34A and 36A may be positioned closer to the opening 26 than in the embodiment.

Furthermore, in the embodiment, the right-to-left direction centers of the regulating surfaces 62 and 64 are preferably respectively positioned on lines b and c, but the present invention is not limited to the same. The regulating surfaces 62 and 64 may be positioned within left-to-right width ranges on lines b and c. That is, the right-to-left direction centers of the regulating surfaces 62 and 64 may not necessarily be respectively positioned on lines b and c.

Still further, in the embodiment, the regulating surfaces 62 and 64 are each preferably recessed with respect to the other part of the front wall 60 by making the draft of the regulating surfaces 62 and 64 smaller, with the lower ends of the regulating surfaces 62 and 64 being made coincident with the lower edge of the other portion of the front wall 60. However, the present invention is not limited to the same. For example, the regulating surfaces 62 and 64 may be each made convex with respect to the other portion of the front wall 60 by making the draft of the regulating surfaces 62 and 64 smaller, with the upper ends of the regulating surfaces 62 and 64 being made coincident with the upper edge of the other portion of the front wall 60. Alternatively, the regulating surfaces 62 and 64 may share the same plane and have the same draft as the other portion of the front wall 60.

In the embodiment, the bucket 72 is moved downward in the direction indicated by arrow B so that the positioning pins 90 are inserted in (engage with) the positioning holes 42 and 44. However, the present invention is not limited to the same. For example, a structure may also be applied in which, in a state in which the regulating surfaces 62 and 64 respectively abut against the regulating protrusions 74 and 76 (in a state in which a depth of the loaded case 16 is regulated), each of the positioning pins 90 moves upward in the direction opposite to that of arrow B to enter the positioning holes 42 and 44.

Furthermore, in the embodiment and modified example thereof, the leader pin 18 is disposed for pulling the magnetic tape 12 out from the case 16, but the present invention is not limited to this structure. Any member, such as a leader block or a leader tape, can be used in place of the leader pin 18.

Still further, in the embodiment, the magnetic tape 12 is used as the recording tape, but the present invention is not limited to the same. Any tape that can serve as a medium on which information can be recorded and from which information can be reproduced, and that has the shape of a long tape, can be used in the recording tape cartridge of the invention.

As described above, the recording tape cartridge according to the invention has an excellent effect in that the accuracy with which the recording tape cartridge can be horizontally positioned in a drive device is improved.

What is claimed is:

1. A recording tape cartridge used with a drive device that includes positioning members, which are inserted into the recording tape cartridge to position the recording tape cartridge when the recording tape cartridge is loaded into the drive device, and an abutting surface, which abuts against at least a portion of the recording tape cartridge disposed along a front surface of the recording tape cartridge, said recording tape cartridge comprising:

a case for accommodating a reel wound with the recording tape, said case comprising a lower case that forms a bottom surface of the case and an upper case that joins with the lower case and forms an upper surface of the case;

a pair of positioning holes formed separately from each other on the bottom surface of the case, said positioning holes being for positioning members of the drive device to be inserted therein;

an opening partially disposed on the front surface, wherein the recording tape is accessible through the opening; and at least one regulating surface disposed so as to face a same direction as, but be recessed from, the front surface of the recording tape cartridge, which front surface of the recording tape cartridge exists between said upper surface and said lower surface of the case and forms a portion of an outer surface of the case, the at least one regulating surface abutting against the abutting surface of the drive device when the recording tape cartridge is loaded into the drive device along a loading direction that is headed from the front surface of the recording tape cartridge to the drive device.

wherein a portion of said at least one regulating surface is disposed so as to intersect a straight line that is perpendicular to a line drawn between the pair of positioning holes, and that passes through one of the pair of positioning holes.

2. The recording tape cartridge of claim 1, further including another regulating surface so that a pair of regulating surfaces is disposed so as to face the same direction as the front surface of the recording tape cartridge.

3. The recording tape cartridge of claim 2, wherein the pair of positioning holes are positioned on a straight line orthogonal to the front surface of the recording tape cartridge.

4. The recording tape cartridge of claim 2, wherein the pair of regulating surfaces regulate a depth to which the case is loaded in the drive device.

5. The recording tape cartridge of claim 3, wherein the pair of regulating surfaces regulate a depth to which the case is loaded in the drive device.

6. The recording tape cartridge of claim 2, wherein the portion of the at least one of the pair of regulating surfaces is a substantial center of the at least one regulating surface.

7. The recording tape cartridge of claim 2, wherein one of the pair of positioning holes is elongated, such that it is larger than a diameter of a positioning member.

8. The recording tape cartridge of claim 2, wherein at least one of the pair of positioning holes is non-elongated such that it corresponds to one of the positioning members, and the portion of the at least one of the pair of regulating surfaces is disposed so as to intersect a straight line that is perpendicular to the line drawn between the pair of positioning holes, wherein said straight line also passes through a non-elongated positioning hole.

9. The recording tape cartridge of claim 2, wherein portions of each of the pair of regulating surfaces are respectively disposed so as to intersect straight lines, wherein each of said straight lines is perpendicular to the line drawn between the pair of positioning holes and passes through one of the pair of positioning holes.

10. The recording tape cartridge of claim 2, further including a pull-out member disposed at an end of the recording tape that is pulled out, with the pull-out member being held by the drive device to pull out the recording tape.

11. The recording tape cartridge of claim 10, wherein the case includes grooves for holding the pull-out member when the recording tape is not pulled out, with the holding grooves being formed such that the pull-out member is substantially positioned on the straight line perpendicular to the line drawn between the pair of positioning holes and passing through one of the pair of positioning holes.

12. The recording tape cartridge of claim 11, wherein the pull-out member has substantially a long slender shape.

13. The recording tape cartridge of claim 2, wherein each of the pair of regulating surfaces comprises a plane that is substantially perpendicular to the straight line perpendicular to the line drawn between the pair of positioning holes.

14. The recording tape cartridge of claim 2, wherein each of the pair of regulating surfaces comprises a recessed surface with respect to the rest of the front surface of the case.

15. The recording tape cartridge of claim 2, wherein each of the pair of regulating surfaces comprises a convex surface with respect to the rest of the front surface of the case.

16. The recording tape cartridge of claim 2, wherein a portion of the front surface other than the regulating surfaces inclines more steeply than the regulating surfaces with respect to a plane parallel to the straight line perpendicular to the line drawn between the pair of positioning holes.

17. The recording tape cartridge of claim 1, wherein the front surface of the recording tape cartridge and the bottom surface are adjacent.

18. The recording tape cartridge of claim 1, wherein at least one of said positioning holes is not located on an edge of said tape cartridge.

19. The recording tape cartridge of claim 1, wherein the recording tape cartridge accommodates only a single reel, on which a recording tape is wound.

20. The recording tape cartridge of claim 1, wherein the at least one regulating surface, which is a different member from the pair of positioning holes, is formed on an outer wall of the recording tape cartridge.

21. The recording tape cartridge of claim 1, wherein the front surface is a surface of the recording tape cartridge, which extends along a front side edge of the bottom surface of the recording tape cartridge and in a direction parallel to the line drawn between the pair of positioning members, and is adjacent to the bottom surface.

22. A drive device for effecting at least one of recording information on and reproducing information from a recording tape accommodated in case of a recording tape cartridge that is loaded into the drive device, said case including a pair of positioning holes, said drive device comprising:

an abutting surface having at least a portion that abuts against at least a portion of the case that is disposed along a front surface of the case when the case is loaded into the drive device, to thereby regulate a depth to which the case is loaded in the drive device, wherein said at least a portion of the front surface is recessed from a remaining portion of the front surface, and the front surface further includes a portion of an opening through which said recording tape may be accessed; and a pair of positioning members that are inserted in the positioning holes when the case is loaded into the drive device and the recording tape cartridge is located at a predetermined position at which at least one of recording and reproducing of information is carried out, wherein said at least a portion of the abutting surface is disposed so as to intersect a straight line that is perpendicular to a line drawn between the pair of positioning members and passing through one of the pair of positioning members.

23. The drive device of claim 22, further comprising a bucket portion which loads the recording tape cartridge into the drive device, wherein the bucket portion comprises positioning holes which correspond to the positioning holes of the recording tape cartridge.

* * * * *